(12) United States Patent
Yamana et al.

(10) Patent No.: US 6,193,955 B1
(45) Date of Patent: Feb. 27, 2001

(54) COPOLYMER, PROCESS FOR THE PREPARATION OF THE SAME, AND USE THEREOF

(75) Inventors: Masayuki Yamana; Kazunori Hayashi; Takashi Enomoto, all of Osaka (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/202,149

(22) Filed: Dec. 9, 1998

(30) Foreign Application Priority Data

Jun. 13, 1996 (JP) .................................................. 8-152290

(51) Int. Cl.[7] .............................. A61L 9/04; A01N 25/06
(52) U.S. Cl. ................................................. 424/45; 424/40
(58) Field of Search .............................. 424/45; 525/276, 525/242

(56) References Cited

U.S. PATENT DOCUMENTS 4,778,915 * 10/1988 Lina et al. .............................. 560/29

FOREIGN PATENT DOCUMENTS

| 0682146-A1 | 11/1995 | (EP) . |
|---|---|---|
| 62-116613 | 5/1987 | (JP) . |
| 4-272988 | 9/1992 | (JP) . |
| 5-214325 | 8/1993 | (JP) . |
| 6-228534 * | 8/1994 | (JP) . |
| 6-313166 | 11/1994 | (JP) . |
| 6-330027 | 11/1994 | (JP) . |
| 92/19663 | 11/1992 | (WO) . |

\* cited by examiner

*Primary Examiner*—Thurman K. Page
*Assistant Examiner*—S. Tran
(74) *Attorney, Agent, or Firm*—Birch, Stewart, Kolasch & Birch, LLP

(57) ABSTRACT

A copolymer having (I) a repeating unit derived from a monomer having a fluorine atom and (II) repeating unit derived from a fluorine-free monomer having at least one urethane or urea linkage and one carbon—carbon double bond, gives excellent water- and oil-repellency and is dissolved in an alcohol solvent.

8 Claims, No Drawings

COPOLYMER, PROCESS FOR THE PREPARATION OF THE SAME, AND USE THEREOF

This application is the national phase under 35 U.S.C. §371 of prior PCT International Application Ser. No. PCT/JP97/01823 which has an International filing date of May 29, 1997 which designated the United States of America.

1. Field of the Invention

The present invention relates to a novel copolymer, a process for producing the same, and use thereof.

2. Related Arts

Heretofore, various water- and oil-repellent agents have been proposed.

Japanese Laid-Open Patent Publication No. 507438/1994 discloses a water- and oil-repellent agent comprising a polymer or copolymer obtained by polymerization of a (meth)acrylate ester reaction product of a diisocyanate, a perfluoro compound or an epichlorohydrin adduct, and a compound containing three hydroxyl groups. However, its water-repellency is insufficient.

Japanese Laid-Open Patent Publication Nos. 330027/1994 and 313166/1994 disclose a water- and oil-repellent base material prepared by polymerization or copolymerization of polymerizable α, β-mono-ethylenically unsaturated monomers having at least two monovalent groups having perfluoroalkyl groups and having a skeleton in which all the monovalent groups are bound to the same carbon atom. However, its water- and oil-repellency is insufficient.

Japanese Laid-Open Patent Publication No. 132850/1987 discloses a water- and oil-repellent made of a polymer comprising a monomer prepared by reacting toluene-2,4-diisocyanate, a compound having a perfluoroalkyl group and an acrylate ester having a hydroxyl group. However, its water-repellency is insuffient.

Japanese Laid-Open Patent Publication No. 214325/1993 discloses a water- and oil-repellent agent composition containing a blocked polyisocyanate compound and a copolymer obtained by copolymerization of at least two monomers comprising an acrylate or methacrylate containing a polyfluoroalkyl group and a polyacrylate or polymethacrylate having an urethane linkage. However, this water- and oil-repellent agent composition is poor in emulsion stability and insoluble in an alcohol solvent.

Conventional water- and oil-repellent polymers are poor in solubility in an alcohol solvent. Further, fluorine-containing urethane compounds having relatively high solubility in the alcohol solvent are poor in water-repellent performance.

SUMMARY OF THE INVENTION

An object of the present invention is to provide a copolymer giving excellent water- and oil-repellency and being dissolved in an alcohol solvent.

The present invention provides a copolymer comprising:
(I) a repeating unit derived from a monomer having a fluorine atom; and
(II) a repeating unit derived from a fluorine-free monomer having at least one urethane or urea linkage and having one carbon—carbon double bond.

The present invention also provides a treatment agent comprising said copolymer and a solvent.

DETAILED DESCRIPTION OF THE INVENTION

The monomer (I) having a fluorine atom may be (meth)acrylate having a $C_3$ to $C_{21}$ polyfluoroalkyl group. The monomer (I) may be a compound represented by the formula:

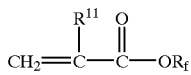

wherein $R^{11}$ is a hydrogen atom or a methyl group, and $R_f$ is a $C_3$ to $C_{21}$ fluoroalkyl group wherein a nitrogen atom, a sulfonyl group and/or an amide group may be present in a C—C bond.

Examples of the monomer (I) having a fluorine atom are as follows:

$CF_3(CF_2)_4CH_2OCOC(CH_3)=CH_2$ $CF_3(CF_2)_7(CH_2)_2OCOC(CH_3)=CH_2$ $CF_3(CF_2)_7(CH_2)_2OCOCH=CH_2$ $(CF_3)_2CF(CF_2)_4(CH_2)_2OCOCH=CH_2$ $CF_3(CF_2)_7SO_2N(C_3H_7)(CH_2)_2OCOCH=CH_2$ $CH_3(CF_2)_7(CH_2)_4OCOCH=CH_2$ $CF_3(CF_2)_7SO_2N(CH_3)(CH_2)_2OCOC(CH_3)=CH_2$ $CF_3(CF_2)_7SO_2N(C_2H_5)(CH_2)_2OCOCH=CH_2$ $CF_3(CF_2)_7CONH(CH_2)_2OCOCH=CH_2$ $(CH_3)_2CF(CF_2)_6(CH_2)_3\ OCOCH=CH_2$ $(CF_)_2CF(CF_2)_6CH_2CH(OCOCH_3)CH_2OCOC(CH_3)=CH_2$ $(CF_3)_2CF(CF_2)_6CH_2CH(OH)CH_2OCOCH=CH_2$ $CF_3(CF_2)_9(CH_2)_2OCOCH=CH_2$ $CF_3(CF_2)_9(CH_2)_2OCOC(CH_3)=CH_2$ $CF_3(CF_2)_9CONH(CH_2)_2OCOC(CH_3)=CH_2$ $(CF_2Cl)(CF_3)CF(CF_2)_6CONH(CH_2)_2OCOCH=CH_2$ $H\ (CF_2)_{10}CH_2OCOCH=CH_2$ $CF_2Cl(CF_2)_{10}CH_2OCOC(CH_3)=CH_2$

The monomer (II) being free of a fluorine atom, having at least one urethane or urea bond and having one carbon—carbon double bond can be obtained by reacting:

(A) a compound having at least two isocyanate groups;

(B) a compound having one carbon—carbon double bond and at least one hydroxyl group or amino group; and (C) a compound having one hydroxyl group or amino group.

Examples of the compound (A) are as follows:

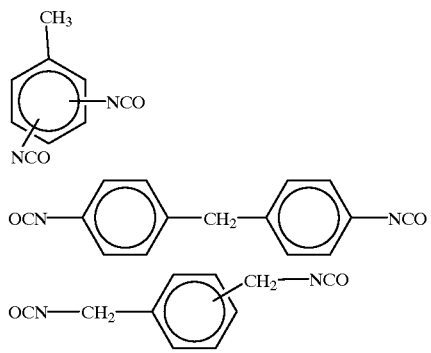

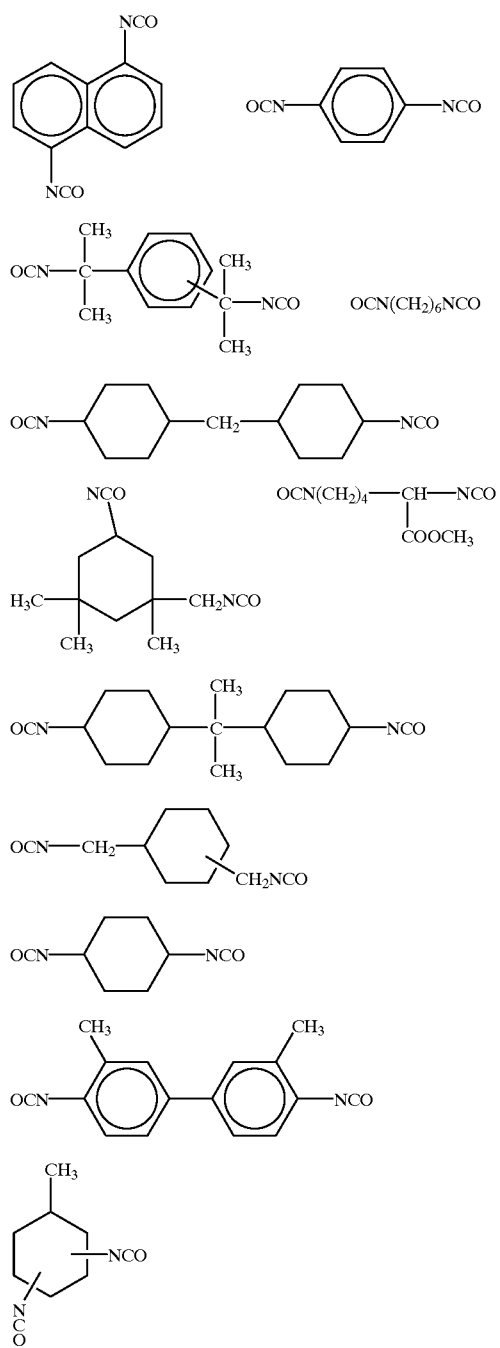

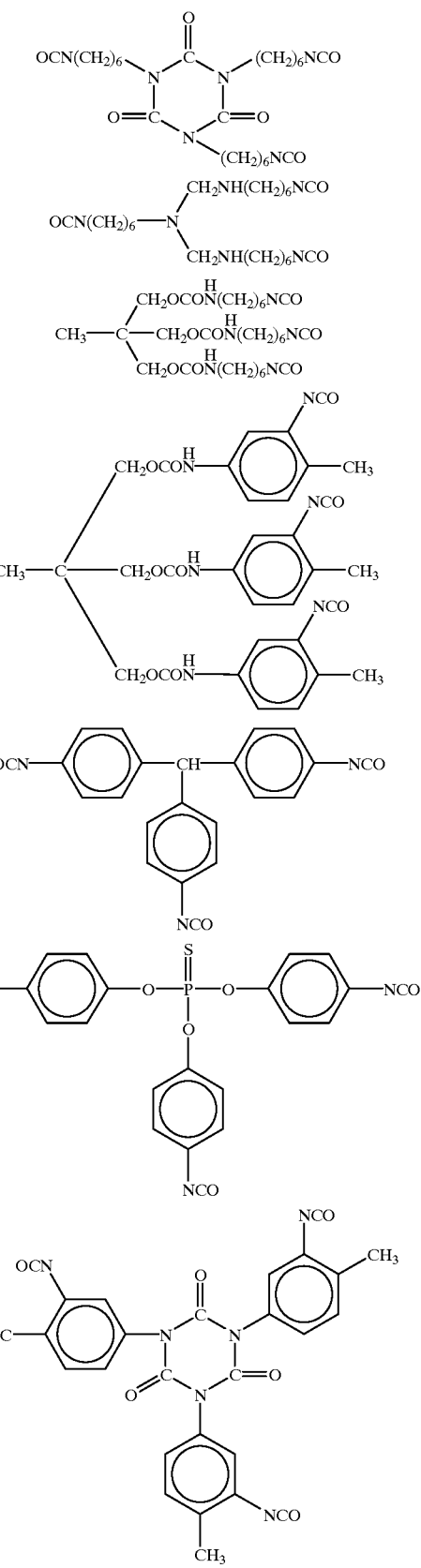

The compound (A) is preferably diisocyanate. However, triisocyanate and polyisocyanate can also be used in the reaction.

For example, a trimer of diisocyanate, polymeric MDI (diphenylmethane diisocyanate), and adducts between a polyhydric alcohol (such as trimethylolpropane, trimethylolethane and glycerin) and a diisocyanate can also be used in the reaction.

Examples of the triisocyanate and polyisocyanate are as follows:

The compound (B) may be a compound represented by e.g. the formulae:

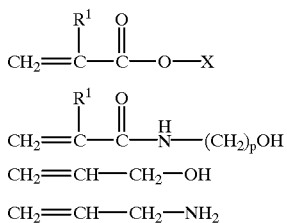

$CH_2=CH-CH_2-OH$ $CH_2=CH-CH_2-NH_2$

In the formulae, $R^1$ is a hydrogen atom or a methyl group. X is as follows:

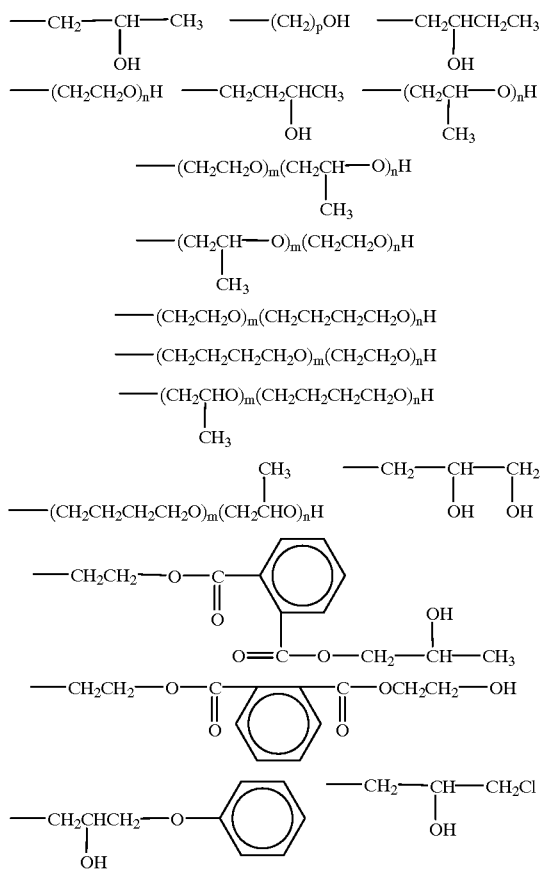

In the formulae, m and n are numbers of 1 to 300.

The compound (C) may be a compound represented by e.g. the formula:

$R^2-OH$ $R^2-NH_2$ or $R^2-NH-R^3$.

In the formulae, $R^2$ and $R^3$ are the same or different and represent a $C_1-C_{22}$ alkyl group which may contain a heteroatom, an aromatic group and/or an alicyclic moiety. The $R^2$ and $R^3$ groups are preferably $C_8H_{17}$, $C_{17}H_{35}$, $C_4H_9$ and cyclohexyl.

Examples of the compound (C) include butyl alcohol, 2-ethylhexyl alcohol, lauryl alcohol, stearyl alcohol, oleyl alcohol, benzyl alcohol, cyclohexyl alcohol, 2-ethylhexyl amine, and stearyl amine.

The compounds (A), (B) and (C) may be reacted in 1 mole of (A) and 1 mole each of (B) and (C) when (A) is diisocyanate or in 1 mole of (A), 1 mole of (B) and 2 moles of (C) when (A) is triisocyanate.

In addition to the monomers (I) and (II), other copolymerizable monomers may be used in the present invention.

The other copolymerizable monomers may be (meth) acrylate esters. Examples of the (meth)acrylate esters include 2-ethylhexyl (meth)acrylate, stearyl (meth)acrylate, cyclohexyl (meth)acrylate, poly(oxyalkylene) (meth) acrylate, glycidyl (meth)acrylate, 2-hydroxyethyl (meth) acrylate, benzyl (meth)acrylate, isocyanatoethyl (meth) acrylate, aziridinyl (meth)acrylate, polysiloxane-containing (meth)acrylate, N,N-dimethylaminoethyl (meth)acrylate, and acetoacetoxyethyl (meth)acrylate. If N,N-dimethylaminoethyl (meth)acrylate is used, the water repellency of cotton is improved.

Additional examples of the other copolymerizable monomers include ethylene, butadiene, isoprene, chloroprene, vinyl acetate, vinyl chloride, vinylidene chloride, styrene, α-methylstyrene, p-methylstyrene, acrylic acid, methacrylic acid, (meth)acrylamide, diacetone (meth)acrylamide, methylolated (meth)acrylamide, N-methylol(meth) acrylamide, vinyl alkyl ether, halogenated alkyl vinyl ether, vinyl alkyl ketone, maleic anhydride, N-vinylcarbazole, and acrylonitrile.

A weight ratio of the monomer (I) to the monomer (II) in the copolymer of the present invention is preferably from 5:95 to 95:5, more preferably from 20:80 to 95:5. The amount of the other copolymerizable monomers is at most 90% by weight of the copolymer, for example, from 5 to 90% by weight. The molecular weight of the copolymer may be from 500 to 1,000,000.

The copolymer can be produced by a solution polymerization, an emulsion polymerization or a suspension polymerization.

The copolymer of the present invention can be produced by a solution polymerization in an organic solvent. Examples of the organic solvent include ketones such as acetone, methyl ethyl ketone and methyl isobutyl ketone; esters such as ethyl acetate, propyl acetate and butyl acetate; alcohols such as ethanol, isopropanol, butanol, 1,3-butanediol and 1,5-pentanediol; halogenated hydrocarbons such as perchloroethylene, Trichlene, 1,1-dichloro-2,2,3,3, 3-pentafluoropropane, 1,3-dichloro-1,2,2,3,3-pentafluoropropane and 1,1-dichloro-1-fluoroethane (HCFC-141b); hydrocarbons such as octane, petroleum, toluene and xylene as well as dipropylene glycol, dipropylene glycol monomethyl ether, tripropylene glycol monomethyl ether, polypropylene glycol, triethylene glycol dimethyl ether, propylene glycol and ethylene glycol.

The organic solvent is preferably a ketone such as methyl ethyl ketone or methyl isobutyl ketone, or ethyl acetate, 1,1-dichloro-1-fluoroethane or the like.

The copolymer of the present invention can also be produced in an aqueous emulsion. Monomers are emulsion-polymerized by use of water, an emulsifying agent and optionally an organic solvent. The mixture may previously be emulsified by a high-pressure emulsifying machine or the like before polymerization.

The emulsifying agent used may be any type of a surface active agent, such as an anionic, cationic or nonionic surface active agent.

Examples of the anionic surface active agent include sodium lauryl sulfate, lauryl sulfate triethanolamine, sodium polyoxyethylene lauryl ether sulfate, sodium polyoxyethylene nonyl phenyl ether sulfate, polyoxyethylene lauryl ether sulfate triethanolamine, sodium cocoyl sarcosine, sodium N-cocoyl methyl taurine, sodium polyoxyethylene coconut alkyl ether sulfate, sodium diether hexyl sulfosuccinate, sodium α-olefin sulfonate, sodium lauryl phosphate, sodium polyoxyethylene lauryl ether phosphate, and perfluoroalkyl carboxylate salt (Unidine DS-101 and 102 manufactured by Daikin Industries Ltd.).

Examples of the cationic surface active agent include dialkyl ($C_{12}$–$C_{22}$) dimethyl ammonium chloride, alkyl (coconut) dimethyl benzyl ammonium chloride, octadecyl amine acetate salt, tetradecyl amine acetate salt, tallow alkyl propylene diamine acetate salt, octadecyl trimethyl ammonium chloride, alkyl (tallow) trimethyl ammonium chloride, dodecyl trimethyl ammonium chloride, alkyl (coconut) trimethyl ammonium chloride, hexadecyl trimethyl ammonium chloride, behenyl trimethyl ammonium chloride, alkyl (tallow) imidazoline quaternary salt, tetradecyl methyl benzyl ammonium chloride, octadecyl dimethyl benzyl ammonium chloride, dioleyl dimethyl ammonium chloride, polyoxyethylene dodecyl monomethyl ammonium chloride, polyoxyethylene alkyl ($C_{12}$–$C_{22}$) benzyl ammonium chloride, polyoxyethylene lauryl monomethyl ammonium chloride, 1-hydroxyethyl-2-alkyl (tallow) imidazoline quaternary salt, a silicone-based cationic surface active agent having a siloxane group as a hydrophobic group, and a fluorine-based cationic surface active agent having a fluoroalkyl group as a hydrophobic group (Unidine DS-202 manufactured by Daikin Industries Ltd.).

Examples of the nonionic surface active agent include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonyl phenyl ether, polyoxyethylene octyl phenyl ether, polyoxyethylene monolaurate, polyoxyethylene monostearate, polyoxyethylene mono-oleate, sorbitan monolaurate, sorbitan monostearate, sorbitan monopalmitate, sorbitan monostearate, sorbitan mono-oleate, sorbitan sesqui-oleate, sorbitan trioleate, polyoxyethylene sorbitan monolaurate, polyoxyethylene sorbitan monopalmitate, polyoxyethylene sorbitan monostearate, polyoxyethylene sorbitan mono-oleate, polyoxyethylene polyoxypropylene block polymer, polyglycerin fatty acid ester, polyether-modified silicone oil (SH3746, SH3748, SH3749 and SH3771 manufactured by Toray Dow Corning Silicone Co., Ltd.), perfluoroalkyl ethylene oxide adduct (Unidine DS-401 and DS-403 manufactured by Daikin Industries Ltd.), fluoroalkyl ethylene oxide adduct (Unidine DS-406 manufactured by Daikin Industries Ltd.), and perfluoroalkyl oligomer (Unidine DS-451 manufactured by Daikin Industries Ltd.).

Examples of the organic solvent used in emulsion polymerization are the same as the organic solvent used in solution polymerization.

In polymerization, a polymerization initiator or ionizing radiation such as γ-ray is used to initiate polymerization. Examples of the polymerization initiator include organic peroxides, azo compounds and persulfate salts.

Examples of the organic peroxides include t-butyl peroxy pivalate, benzoyl peroxide, lauroyl peroxide, di-t-butyl peroxide, and di-isopropyl peroxy dicarbonate. Examples of the azo compounds include 2,2'-azobisisobutyronitrile and 2,2'-azobis(2-methylbutyronitrile).

The copolymer of the present invention can be used as a treatment agent. The treatment agent may be a water- and oil-repellent. The treatment agent comprises the copolymer and a solvent. The solvent may be water, an alcohol (e.g. alkanol), a ketone, an ester, an ether (e.g. glycol ether) or a mixture thereof. The solvent used in the treatment agent may be different from the solvent used for polymerization. If the solvent in the treatment agent is different from the polymerization solvent, the polymerization solvent shall be removed (by evaporation etc.) before preparation of the treatment agent.

The alcohol used in the treatment agent includes $C_1$ to $C_4$ lower alkanols such as methanol, ethanol, 2-propanol and n-butanol. Among these lower alkanols, ethanol and 2-propanol are preferable in view of safety. Alkanols having at least five carbon atoms are not preferable because of poor drying characteristics. These lower alkanols can be used singly or in combination thereof.

Solvents such as isoparaffin, n-heptane, n-hexane, mineral terpene, ethyl acetate, toluene, methyl ethyl ketone and methyl isobutyl ketone can be added at a less dangerous level. As a matter of course, a substitute fluorocarbon such as fluorocarbon 141b can also be used. Further, the addition of a small amount of glycol ethers such as dipropylene glycol monomethyl ether is also effective in preventing whitening.

In an aerosol stock liquid, a weight ratio of the copolymer to the solvent may be in the range of from 0.05:99.95 to 5.0:95.0, preferably from 0.1:99.9 to 3.0:97.0.

A wide variety of additives can be added to the treatment agent of the present invention according to necessity. Among the additives, an organopolysiloxane is important because it can improve water repellency. The organopolysiloxane used may be a silicone oil, a silicone dispersion or a mixture thereof. The silicone oil is most typically dimethyl polysiloxane having various degrees of polymerization at a viscosity ranging from 6,500 to 300,000 cS at 25° C., which is represented by the following formula:

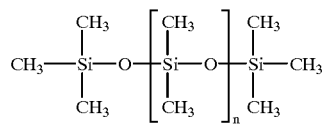

Further, a main chain of some organopolysiloxanes may contain a small amount of the following group:

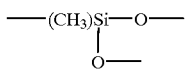

Other examples include those having —$(CH_3CH_2)_2$SiO—, —$(CH_3)HSiO$—, —$(C_6H_5)_2SiO$—, —$(C_6H_5)(CH_3)$SiO— or a mixture of these groups, in place of —$(CH_3)_2$SiO—. Further, some organopolysiloxanes may have the terminal of the main chain Si—O—Si substituted with a hydroxyl group. Further, there are a wide variety of modified silicone oil having these side chains chlorinated or being modified by introducing an amino group, epoxy group, polyether group, carboxyl group, hydroxyl group, trifluoroalkyl group, alcohol ester group, alkyl group or the like. The silicone dispersion is a dispersion in which silicone resin or silicone rubber at an initial stage of polymerization has been dissolved in a solvent, and it forms a film having a three-dimensional network structure through condensation upon heating. In the present invention, a wide variety of organopolysiloxanes can be used without limitation to those enumerated above. For these organopolysiloxanes, there are many types of commercial products. Examples of the commercial products include SH200, PRX413, SH8011 and SD8000 (manufacture by Toray Dow Corning Silicone Co., Ltd.), KP-801M, KPN-3504 (manufactured by Shin-Etsu Chemical Co., Ltd.). The amount of organopolysiloxane incorporated may be from about 0.05 to about 10% by weight, preferably from about 0.5 to 5% by weight, based on the aerosol stock liquid.

Stain preventing agents, UV preventing agents, surface active agents, sterilizing agents, insecticides, antistatic agents, perfumes or the like as described in Japanese Patent Kokoku Publication Nos. 6163/1987 and 33797/1988 may be added to the treatment agent of the present invention according to necessity. In order to soften treated fabrics, to prevent electrification of treated fabrics, to improve water and oil repellency and to improve shrink-resistance, an antistatic agent, an aminoplast resin, an acrylic polymer, a glyoxal resin, a melamine resin, a natural wax, a silicone resin or the like may further be added in such amounts that the effect of the present invention is not inhibited.

The treatment agent of the present invention can be prepared in a usual manner to give any arbitrary form such as an emulsion, a solvent solution and an aerosol. For example, an aqueous emulsion-type composition can be prepared by the above-described emulsion polymerization method, or a solvent solution-type composition and an aerosol composition can be prepared by the solution polymerization method.

The treatment agent of the present invention is used preferably as the aerosol. The treatment agent of the present invention can be converted easily into the aerosol by adding a pressurizing agent to a stock liquid and introducing the mixture into a vessel. Examples of the pressurizing agent includes a liquefied petroleum gas (LPG), propane, butane, dimethyl ether, carbon dioxide gas and nitrogen gas. According to necessity, a substitute fluorocarbon such as HFC-134a and HCFC-141b can be also used. A weight ratio of the stock liquid to the pressurizing agent is from 99.5/0.5 to 30/70, preferably from 99/1 to 50/50.

A substrate to be treated with the water- and oil-repellent agent composition of the present invention are not particularly limited, and various examples can be enumerated. Examples of the substrate include textiles, glass, papers, woods, leathers, furs, asbestos, bricks, cements, metals and oxides, ceramics, plastics, coating surfaces and plasters. Examples of the textile include animal and vegetable-originated natural fibers such as cotton, hemp, wool and silk; various synthetic fibers such as polyamide, polyester, polyvinyl alcohol, polyacrylonitrile, polyvinyl chloride and polypropylene; semi-synthetic fibers such as rayon and acetate; inorganic fibers such as glass fibers and asbestos fibers; and fiber blends thereof, as well as yarns and fabrics (woven fabrics, non-woven fabrics, knitted fabrics) comprising these fibers.

PREFERRED EMBODIMENTS OF THE INVENTION

Hereinafter, the present invention is described in detail with reference to the Examples and Comparative Examples. Unless otherwise specified, the term "part" is part by weight.

Water repellency and oil repellency shown in the Examples and Comparative Examples are expressed by the following evaluations. Water repellency is expressed in terms of water repellency No. (see Table 1 below) by a spray method in accordance with JIS (Japanese Industrial Standard) L-1092. Oil repellency is expressed in terms of oil repellency No. by observing the state whether qr not the drop can be maintained on the cloth for 30 seconds after one drop (about 5 mm in diameter) of a test solution shown in Table 2 below is placed on a sample cloth (AATCC TM118-1992). The symbol "+" assigned to water repellency No. indicates slightly good performance and the symbol "−" indicates slightly poor performance.

TABLE 1

| Water repellency No. | State |
|---|---|
| 100 | No wet on the surface |
| 90 | Slight wet on the surface |
| 80 | Partial wet on the surface |
| 70 | Wet on the surface |
| 50 | Wet on the whole surface |
| 0 | Complete wet on the front and back surfaces |

TABLE 2

| Oil repellency No. | Test solution | Surface tension (dyne/cm, 25° C.) |
|---|---|---|
| 8 | n-Heptane | 20.0 |
| 7 | n-Octane | 21.3 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture of n-hexadecane/nujol (35/65) | 29.6 |
| 1 | Nujol | 31.2 |
| 0 | inferior to 1 | — |

A stainproof test was conducted in accordance with JIS L 1023-1992. First, a carpet is contaminated with dry soil having the composition set forth in Table 3 in accordance with JIS L 1023-1992.

TABLE 3

| Ingredients | Ratio by weight (%) |
|---|---|
| Peat moth | 40 |
| Portland cement (JIS R 5210) | 17 |
| White clay (JIS K 8746) | 17 |
| Diatomaceous earth (JIS K 8330) | 17 |
| Carbon black (JIS K 5107) | 0.1 |
| Iron (III) oxide for ferrite (JIS K 1462) | 0.15 |
| Nujol | 8.75 |

Thereafter, excess dry soil on the surface is suctioned with a vacuum-cleaner, and then the brightness of the surface is measured with a calorimeter, and the degree of contamination is calculated by the following equation to evaluate dry soil stainproofness.

$$\text{Degree of contamination } (\%) = [(L_0 - L)/L_0] \times 100$$

wherein $L_0$ is brightness before contamination, and L is brightness after contamination.

Productions of monomers having urethane linkages are shown in Preparative Examples 1 to 4.

PREPARATIVE EXAMPLE 1 (production of product U1)

348 g of 2,4-tolylene diisocyanate was dissolved in 348 g of methyl isobutyl ketone (MIBK) in a flask equipped with a stirrer, a thermometer, a reflux condenser and a dropping funnel, then nitrogen was introduced, and the temperature was raised to 80 ° C. under stirring. When the temperature reached 80° C., two drops of dibutyl tin laurate were added, and simultaneously, dropwise addition of 260 g of 2-ethylhexyl alcohol was initiated, and it was added slowly over the period of 2 hours. After the completion of addition, 260 g of 2-hydroxyethyl methacrylate was slowly added dropwise over the period of 2 hours. After the completion of addition, the solution was further stirred at a constant temperature of 80° C. for 2 hours. Thereafter, the MIBK was distilled off under reduced pressure whereby 868 g of viscous pale yellow transparent liquid was obtained. Complete disappearance of the —NCO group was confirmed by IR, and the disappearance of —OH, the formation of urethane linkages and the presence of double bonds were confirmed by $^1$H-NMR and $^{13}$C-NMR. This product is referred to as U1.

The estimated chemical formula of product U 1 was as follows:

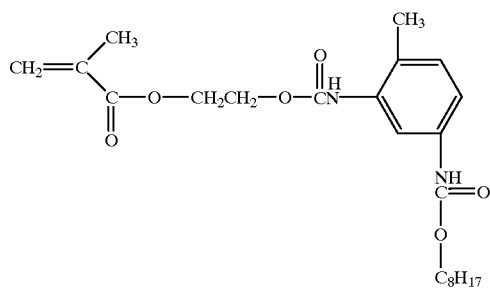

PREPARATIVE EXAMPLE 2 (production of product U2)

Reaction was performed in the same manner as in Preparative Example 1 except that the order of dropwise addition of 2-ethylhexyl alcohol and 2-hydroxyethyl methacrylate was changed (that is, 2-hydroxyethyl methacrylate was first added). The resulting product is referred to as U2.

The estimated chemical formula of product U2 was as follows:

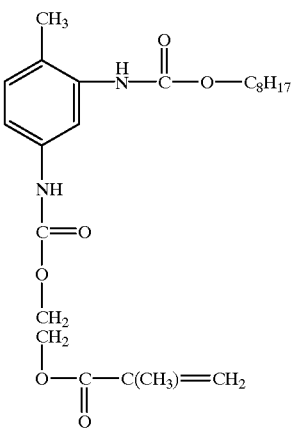

PREPARATIVE EXAMPLE 3 (production of product U3)

Reaction was performed in the same manner as in Preparative Example 1 except that 500 g of diphenyl methane diisocyanate (MDI) dissolved in 500 g of MIBK was used in place of 348 g of 2,4-tolylene diisocyanate dissolved in 348 g of MIBK. The resulting product is referred to as U3.

The estimated chemical formula of product U3 was as follows:

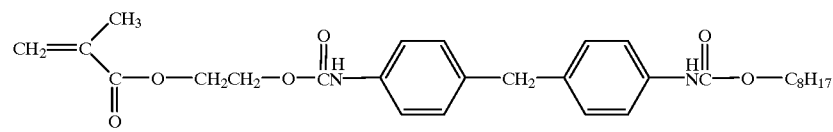

PREPARATIVE EXAMPLE 4 (production of product U4)

Reaction was performed in the same manner as in Preparative Example 1 except that 336 g of hexamethylene diisocyanate (HDI) dissolved in 336 g of MIBK was used in place of 348 g of 2,4-tolylene diisocyanate dissolved in 348 g of MIBK. The resulting product is referred to as U4.

The estimated chemical formula of product U4 was as follows:

$$CH_2=C(CH_3)-C(O)-O-CH_2CH_2-O-C(O)-N(H)-(CH_2)_6-N(H)-C(O)-O-C_8H_{17}$$

In the Preparative Examples shown below, the monomers shown in Table 4 were used.

Monomer I $$CH_2=CH-C(O)-O-CH_2CH_2-C_8F_{17}$$

Monomer II $$CH_2=CH-C(O)-O-CH_2CH_2NSO_2C_8F_{17}$$
$$| $$
$$CH_2CH_3$$

Monomer III $$CH_2=C(CH_3)C(O)-O-CH_2CH_2-C_8F_{17}$$

Monomer IV $$CH_2=CH-C(O)-O-CH_2CH_2-N(CH_3)_2$$

Monomer V $$CH_2=C(CH_3)C(O)-O-CH_2CH_2-OH$$

Monomer VI $$CH_2=CH-C(O)-O-Si(OCH_3)_3$$

Monomer VII $$CH_2=CH-C(O)-O-C_8F_{17}$$

Monomer VIII $$CH_2=CH-C(O)-O-C_{18}F_{17}$$

PREPARATIVE EXAMPLE 5

120 g of monomer I (fluorine-containing acrylate) shown in Table 4 and 80 g of U1 (monomer containing urethane linkages) synthesized in Preparative Example 1 were dissolved in 800 g of MIBK in a flask equipped with a stirrer, a thermometer and a reflux condenser, then nitrogen was introduced, and the temperature was raised to 60° C. under stirring.

At one hour after nitrogen was introduced, the inner temperature was confirmed to be 60° C., and polymerization was initiated by adding 4 g of t-butylperoxy pivalate (Perbutyl manufactured by NOF Corp.).

At 8 hours after polymerization was initiated, it was confirmed by gas chromatography that 99% of monomer I was reacted, and a pale yellow liquid having a solid content of 20% was thereby obtained. GPC analysis indicated that the solid had a number average molecular weight of 5,000 (in terms of polystyrene).

PREPARATIVE EXAMPLE 6–17 AND COMPARATIVE PREPARATIVE EXAMPLES 1 and 2

Fluorine-containing acrylates, urethane linkage-containing monomers, and other monomers were combined as shown in Table 5 and polymerized in the same manner as in Preparative Example 5.

In the Preparative Examples using monomer IV, however, AIBN (azobisisobutyronitrile) was used as a polymerization initiator and the polymerization temperature was 80° C.

TABLE 5

| Preparative Example No. | A Fluorine-containing acrylate | B Urethane linkage-containing monomer | C, D Other monomer | Weight ratio A/B (/C/D) |
|---|---|---|---|---|
| 5 | I | U1 | none | 60/40 |
| 6 | I | U2 | none | 60/40 |
| 7 | I | U3 | none | 60/40 |
| 8 | I | U4 | none | 60/40 |
| 9 | II | U1 | none | 60/40 |
| 10 | III | U1 | none | 60/40 |
| 11 | I | U1 | IV | 60/37/3 |
| 12 | I | U1 | V | 60/35/5 |
| 13 | I | U1 | VI | 60/35/5 |
| 14 | I | U1 | VII | 60/35/5 |
| 15 | I | U1 | VIII | 60/35/5 |
| 16 | I | U1 | IV, VII | 60/30/5/5 |
| 17 | I | U1 | IV, VIII | 60/30/5/5 |
| Comp. Prep. Ex. No. 1 | I | — | VII | 60/0/40 |
| Comp. Prep. Ex. No. 2 | I | — | VIII | 60/0/40 |

EXAMPLE 1

The solution obtained in Preparative Example 5 was diluted to a solid content of 1% with isopropyl alcohol (IPA) to determine its solubility in IPA at low temperature and this solution was used to treat a cloth to determine its water- and oil-repellency.

The test was conducted using a polyester tropical cloth (white cloth), a nylon taffeta cloth (white cloth), and a cotton broad cloth (white cloth).

The cloth was immersed in the solution diluted as described above, and then squeezed with a mangle such that the wet pickup of the solution was about 40%, and the cloth was dried at room temperature for 1 hour.

EXAMPLES 2 TO 13

The polymers shown in Table 6 were used and the water- and oil-repellency was measured in the same manner as in Example 1.

COMPARATIVE EXAMPLES 1 AND 2

The solutions obtained in Comparative Preparative Examples 1 and 2 were used and the water- and oil-repellency was measured in the same manner as in Example 1.

COMPARATIVE EXAMPLE 3

A polymer was prepared in the same manner as in Examples 2 and 10 of Japanese Laid-Open Patent Publication No. 507438/1994, and this polymer was diluted to a solid content of 1% with IPA and its water- and oil-repellency was measured in the same manner as in Example 1.

COMPARATIVE EXAMPLE 6

An aerosol was produced in the same manner as in Example 9 of Japanese Laid-Open Patent Publication No. 313166/1994. The test results are shown in Table 7.

TABLE 6

| Example No. | IPA solubility 0° C. | IPA solubility 20° C. | Water repellency Polyester | Water repellency Cotton | Water repellency Nylon | Oil repellency polyester | Oil repellency Cotton | Oil repellency Nylon | Used polymer Prep. Ex. No. |
|---|---|---|---|---|---|---|---|---|---|
| 1 | ○ | ○ | 90 | 70 | 90 | 6 | 4 | 5 | 5 |
| 2 | ○ | ○ | 90 | 70 | 90 | 6 | 4 | 5 | 6 |
| 3 | Δ | ○ | 90 | 70 | 90 | 6 | 4 | 5 | 7 |
| 4 | Δ | ○ | 90 | 70 | 90 | 6 | 4 | 5 | 8 |
| 5 | ○ | ○ | 90 | 70 | 80 | 5 | 3 | 4 | 9 |
| 6 | ○ | ○ | 90 | 70 | 90 | 6 | 4 | 5 | 10 |
| 7 | ○ | ○ | 90 | 80 | 90 | 6 | 5 | 5 | 11 |
| 8 | ○ | ○ | 90 | 70 | 90 | 6 | 5 | 5 | 12 |
| 9 | ○ | ○ | 100 | 80 | 90 | 4 | 3 | 4 | 13 |
| 10 | Δ | ○ | 90 | 70 | 90 | 6 | 5 | 5 | 14 |
| 11 | Δ | ○ | 100 | 80 | 90 | 4 | 3 | 4 | 15 |
| 12 | ○ | ○ | 90 | 80 | 90 | 6 | 5 | 5 | 16 |
| 13 | ○ | ○ | 100 | 80 | 90 | 5 | 3 | 4 | 17 |
| Com. Ex. 1 | X | X | | | not treatable | | | | Com. Prep. Ex. 1 |
| Com. Ex. 2 | X | X | | | not treatable | | | | Com. Prep. Ex. 1 |
| Com. Ex. 3 | Δ | ○ | 70 | 50 | 70 | 4 | 3 | 4 | — |

○ = dissolved
Δ = slightly cloudy but stable
X = precipitated

EXAMPLES 14–26 AND COMPARATIVE EXAMPLE 4

The product obtained in each of Examples 1 to 13 and Comparative Example 3 and a carbon dioxide gas as a pressurizing agent were introduced into a non-coated tin cans to produce a aerosol product having the composition in the following table.

| Composition of the stock liquid | |
|---|---|
| Solid content | 1.0% |
| MIBK | 5.0% |
| IPA | 94.0% |
| Total | 100% |
| Composition of the aerosol | |
| Stock liquid | 96.3% |
| Carbon dioxide gas | 3.7% |
| Total | 100% |

Then, test clothes (polyester tropical, cotton broad, and nylon taffeta) were cut into pieces of 20 cm×20 cm and sprayed for 4 seconds with the aerosol. The clothes were dried at room temperature for 1 hour to give water- and oil-repellent test samples. The test results are shown in Table 7.

COMPARATIVE EXAMPLE 5

An aerosol was produced in the same manner as in Example 1 of Japanese Laid-Open Patent Publication No. 313166/1994, and the water- and oil-repellency test was conducted. The test results are shown in Table 7.

TABLE 7

| Example No. | Water repellency Polyester | Water repellency Cotton | Water repellency Nylon | Oil repellency Polyester | Oil repellency Cotton | Oil repellency Nylon |
|---|---|---|---|---|---|---|
| 14 | 90 | 70 | 90 | 6 | 4 | 5 |
| 15 | 90 | 70 | 90 | 6 | 4 | 5 |
| 16 | 90 | 70 | 90 | 6 | 4 | 5 |
| 17 | 90 | 70 | 90 | 6 | 4 | 5 |
| 18 | 80 | 70 | 80 | 5 | 3 | 4 |
| 19 | 90 | 70 | 90 | 6 | 4 | 5 |
| 20 | 90 | 80 | 90 | 6 | 5 | 5 |
| 21 | 90 | 70 | 90 | 6 | 5 | 5 |
| 22 | 100 | 80 | 90 | 4 | 3 | 4 |
| 23 | 90 | 70 | 90 | 6 | 5 | 5 |
| 24 | 100 | 80 | 90 | 4 | 3 | 4 |
| 25 | 90 | 80 | 90 | 6 | 5 | 5 |
| 26 | 100 | 80 | 90 | 5 | 3 | |
| Com. Ex. 4 | 70 | 70 | 70 | 4 | 3 | 4 |
| Com. Ex. 5 | 70 | 50 | 70 | 3 | 1 | 3 |
| Com. Ex. 6 | 80 | 50 | 80 | 1 | 0 | 0 |

PREPARATIVE EXAMPLE 18

120 g of monomer I (fluorine-containing acrylate) shown in Table 4 and 80 g of U1 (urethane linkage-containing monomer) synthesized in Preparative Example 1 were dissolved in 20 g of methyl isobutyl ketone (MIBK), and then 12 g of sodium α-olefin sulfonate, 8 g of polyoxyethylene nonyl phenyl ether and 880 g of ion-exchanged water were added thereto and preliminarily emulsified with a high-pressure homogenizer. The resulting emulsion was transferred to a flask equipped with a stirrer, a thermometer and a reflux condenser, and the atmosphere was fully purged with nitrogen at 60° C. The polymerization was initiated by adding 1.1 g of ammonium persulfate. At 10 hours after polymerization was initiated, it was confirmed by gas chromatography that 99% of monomer I was reacted. An emulsion having a solid content of 20% was thereby obtained.

COMPARATIVE PREPARATIVE EXAMPLE 3

Emulsion polymerization was performed in the same manner as in Preparative Example 18 except that monomer VIII was used in place of monomer U1 in Preparative Example 18, whereby an emulsion having a solid content of 20% was obtained.

PREPARATIVE EXAMPLE 19

120 g of monomer I (fluorine-containing acrylate) shown in Table 4, 20 g of monomer U1 and 60 g of monomer VIII shown in Table 4 were dissolved in 800 g of n-octane in a flask equipped with a stirrer, a thermometer and a reflux condenser, and then nitrogen was introduced under stirring, and the temperature was raised to 60° C. At one hour after nitrogen was introduced, polymerization was initiated by adding 4 g of t-butyl peroxypivalate. At 8 hours after polymerization was initiated, it was confirmed by gas chromatography that at least 99% of monomers I and VIII were reacted. A pale yellow liquid having a solid content of 20% was thereby obtained.

COMPARATIVE PREPARATIVE EXAMPLE 4

Solution polymerization was performed in the same manner as in Preparative Example 19 except that 80 g of monomer VIII was charged in place of 20 g of monomer U1 and 60 g of monomer VIII in Preparative Example 19, whereby a colorless transparent solution having a solid content of 20% was obtained.

EXAMPLE 27

The emulsion obtained in Preparative Example 18 was diluted to a solid content of 3% with water, and this solution was uniformly sprayed at 100 g/m² on a nylon loop pile carpet fabric (non-backed article). For this spraying, the hand spraying was used. Thereafter, it was dried at 130° C. for 5 minutes. This treated carpet was examined in the oil-repellency test and stainproof test. The results are shown in Table 8.

EXAMPLE 28

The emulsion obtained in Preparative Example 18 and polymethyl methacrylate/ethyl methacrylate (MMA/EMA ratio by weight=80/20 by weight) described in Japanese Laid-Open Patent Publication No. 3113/1996 were mixed in a solid weight ratio of 1:1, then diluted to a solid content of 3% with water, and examined as described in Example 27. The results are shown in Table 8.

COMPARATIVE EXAMPLE 7

The emulsion obtained in Comparative Preparative Example 3 was used and tested in the same manner as in Example 27. The results are shown in Table 8.

EXAMPLE 29

The solution in Preparative Example 19 was diluted to a solid concentration of 10 wt % with n-octane, and 50 g of the solution was kept standing in a thermostatic chamber at each temperature of 10° C., 0° C., −5° C., and −10° C. for 24 hours, and then their states were evaluated. The results are shown in Table 9.

COMPARATIVE EXAMPLE 8

The solution in Comparative Preparative Example 4 was diluted to a solid concentration of 10 wt % with n-octane, and 50 g of the solution was kept standing in a thermostatic chamber at each temperature of 10° C., 0° C., −5° C. and −10° C. for 24 hours, and then their conditions were evaluated. The results are shown in Table 9.

TABLE 8

|  | Oil repellency | Stainproofness |
| --- | --- | --- |
| Example 27 | 6 | 20 |
| Example 28 | 5 | 18 |
| Comparative Example 7 | 1 | 31 |

TABLE 9

|  | Temperature | | | |
| --- | --- | --- | --- | --- |
|  | 10° C. | 0° C. | −5° C. | −10° C. |
| Example 29 | not coagulated | not coagulated | not coagulated | not coagulated |
| Comparative Example 8 | coagulated | coagulated | coagulated | coagulated |

EFFECTS OF THE INVENTION

The copolymer of the present invention is excellent both in solubility in an alcohol solvent and in water- and oil-repellent performance.

What is claimed is:

1. A copolymer comprising:
   (I) a repeating unit derived from a monomer having a fluorine atom; and
   (II) a repeating unit derived from a fluorine-free monomer having at least one urethane or urea linkage and having one carbon—carbon double bond;
      wherein the monomer (II) is a monomer obtained by reacting:
      (A) a compound having at least two isocyanate groups;
      (B) a compound having one carbon—carbon double bond and at least one hydroxyl group or amino group; and
      (C) a compound having one hydroxyl group or amino group, represented by the formula:

$R^2$—OH $R^2$—$NH_2$ or $R^2$—NH—$R^3$.

wherein $R^2$ and $R^3$ are the same or different and represent a $C_1$–$C_{22}$ alkyl group which may contain an aromatic group and/or an alicyclic moiety wherein the compound (C does not contain a sulfur atom.

2. A treatment agent comprising the copolymer according to claim 1 and a solvent.

3. The treatment agent according to claim 2, which is in the form of a solution, an emulsion or an aerosol.

4. A process for producing the copolymer according to claim 1, wherein copolymerization is carried out in an organic solvent solution or an aqueous emulsion.

5. A treatment agent comprising the copolymer according to claim 1, and a solvent.

6. The copolymer according to claim 1, wherein $R^2$ and $R^3$ are selected from the group consisting of $C_8H_{17}$, $C_{17}H_{35}$, $C_4H_9$, and cyclohexyl.

7. The copolymer according to claim 1, wherein compound (C) is selected from the group consisting of butyl alcohol, 2-ethylhexyl alcohol, lauryl alcohol, stearyl alcohol, oleyl alcohol, benzyl alcohol, cyclohexyl alcohol, 2-ethylhexyl amine, and stearyl amine.

8. The copolymer according to claim 1, wherein the aromatic group and alicyclic moiety of $R^2$ and $R^3$ of compound (C) contains only carbon and hydrogen atoms.

\* \* \* \* \*

UNITED STATES PATENT AND TRADEMARK OFFICE
CERTIFICATE OF CORRECTION

PATENT NO. : 6,193,955 B1
DATED : February 27, 2001
INVENTOR(S) : Masayuki Yamana et al.

It is certified that error appears in the above-identified patent and that said Letters Patent is hereby corrected as shown below:

<u>Title page,</u>
Please insert categories [86] and [87] as follows:

-- [86] PCT No.: PCT/JP9/01823
     § 371 Date: December 9, 1998
     §102(e) Date: December 9, 1998 --
--[87] PCT Pub. No.: WO97/47667
     PCT Pub. Date: December 18, 1997 --.

Signed and Sealed this

Fifth Day of March, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,193,955 B1  
DATED : February 27, 2001  
INVENTOR(S) : Masayuki Yamana et al.

It is certified that error appears in the above-identified patent and that said Letters Patent is hereby corrected as shown below:

<u>Title page,</u>  
Please insert categories [86] and [87] as follows:

-- [86] PCT No.: PCT/JP97/01823  
§ 371 Date: December 9, 1998  
§ 102(e) Date: December 9, 1998 --  
-- [87] PCT Pub. No.: WO97/47667  
PCT Pub. Date: December 18, 1997 --.

This certificate supersedes Certificate of Correction issued March 5, 2002

Signed and Sealed this

Twenty-fifth Day of June, 2002

Attest:

Attesting Officer

JAMES E. ROGAN  
*Director of the United States Patent and Trademark Office*